United States Patent
Zaifman et al.

(10) Patent No.: US 12,047,992 B2
(45) Date of Patent: Jul. 23, 2024

(54) SYSTEMS AND METHODS FOR EDGE DEVICE RESOURCE MANAGEMENT AND COORDINATION BASED ON RADIO FREQUENCY MODELING

(71) Applicant: Verizon Patent and Licensing Inc., Basking Ridge, NJ (US)

(72) Inventors: Art Zaifman, Millburn, NJ (US); Ravi Sharma, Freehold, NJ (US); Jason Bowers, Aurora, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 337 days.

(21) Appl. No.: 17/654,249

(22) Filed: Mar. 10, 2022

(65) Prior Publication Data

US 2023/0292354 A1   Sep. 14, 2023

(51) Int. Cl.
*H04W 72/542* (2023.01)
(52) U.S. Cl.
CPC ................................. *H04W 72/542* (2023.01)
(58) Field of Classification Search
CPC .. H04W 28/16; H04W 72/542; H04W 88/085
See application file for complete search history.

(56) References Cited

U.S. PATENT DOCUMENTS

| | | | | |
|---|---|---|---|---|
| 8,891,417 | B2 * | 11/2014 | Fujishima | H04W 72/542 370/339 |
| 10,931,586 | B2 * | 2/2021 | Li | H04L 47/24 |
| 11,849,442 | B2 * | 12/2023 | Kotaru | H04L 5/0057 |
| 2017/0127409 | A1 * | 5/2017 | Mishra | H04W 72/29 |
| 2019/0200373 | A1 * | 6/2019 | Becvar | G06N 20/00 |
| 2020/0275313 | A1 * | 8/2020 | He | H04W 28/0838 |
| 2020/0296054 | A1 * | 9/2020 | Asawa | H04L 47/821 |

* cited by examiner

*Primary Examiner* — Thomas R Cairns

(57) ABSTRACT

A system described herein may monitor, via a Central Unit ("CU") of a radio access network ("RAN"), radio frequency ("RF") metrics associated with a User Equipment ("UE"). The monitored RF metrics may be based on communications between the UE and a Distributed Unit ("DU") that is communicatively coupled to the CU. The system may identify a Multi-Access/Mobile Edge Computing ("MEC") device that is communicatively coupled to the DU and that provides one or more services to the UE via the DU. The system may resource allocation parameters for the MEC based on the RF metrics between the UE and the DU. The system may instruct the MEC to implement the set of resource allocation parameters. The MEC may modify an allocation of MEC resources, allocated for providing the one or more services to the UE, based on the determined set of resource allocation parameters.

20 Claims, 12 Drawing Sheets

SYSTEMS AND METHODS FOR EDGE DEVICE RESOURCE MANAGEMENT AND COORDINATION BASED ON RADIO FREQUENCY MODELING

BACKGROUND

Wireless networks may make use of edge devices, such as Multi-Access/Mobile Edge Computing ("MEC") devices, referred to sometimes herein simply as "MECs," which may provide services to User Equipment ("UEs") connected to a radio access network ("RAN"). MECs may, for example, receive traffic from UEs connected to the RAN, perform computations or other operations, and may provide traffic to such UEs, without such traffic traversing a core of the wireless network.

DETAILED DESCRIPTION OF EXAMPLE EMBODIMENTS

Figure 1A:
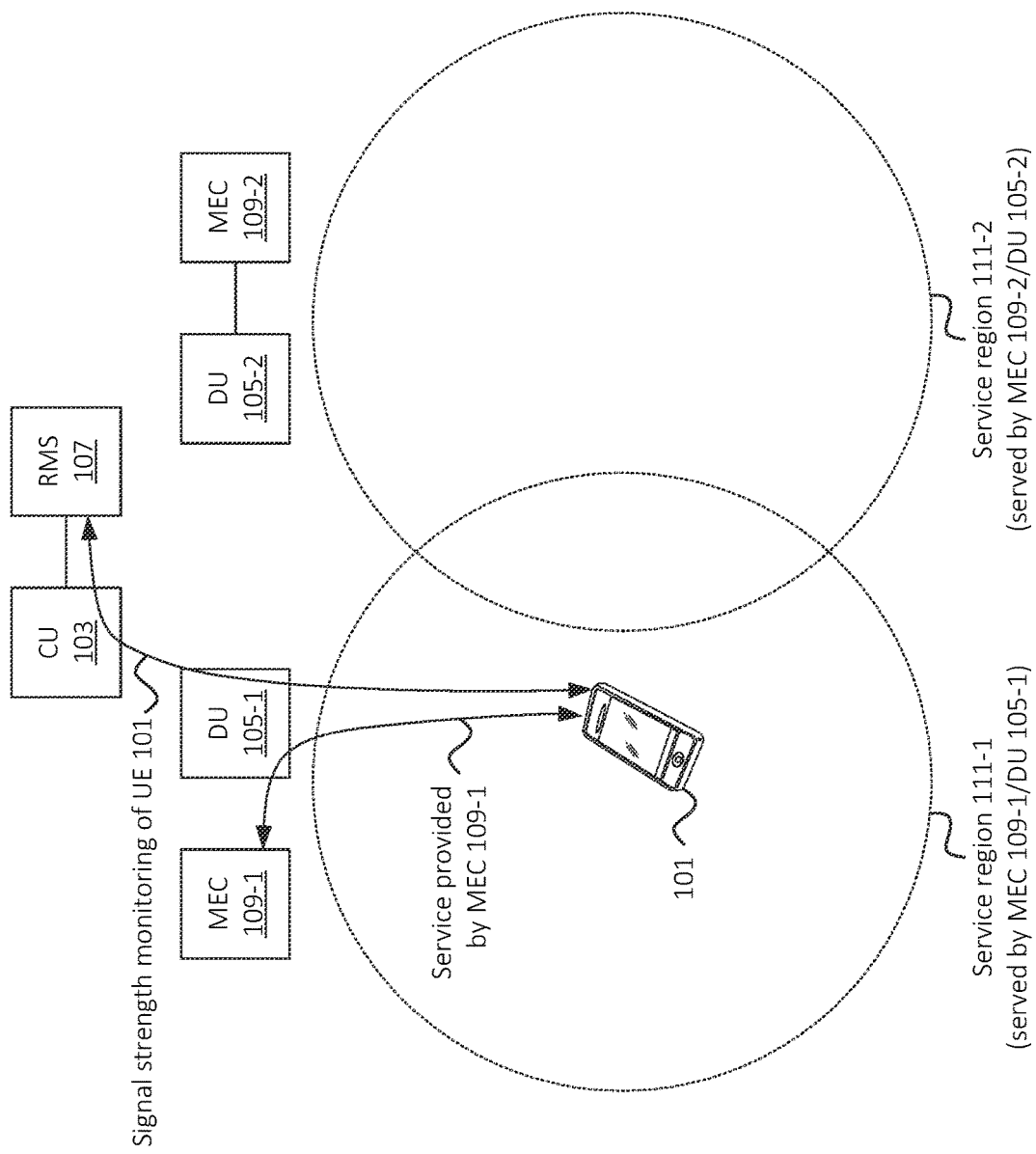
FIGS. 1A-1F illustrate an example overview of one or more embodiments described herein.

The following detailed description refers to the accompanying drawings. The same reference numbers in different drawings may identify the same or similar elements.

Embodiments described herein provide for the dynamic configuration of MEC resources at one or more MECs based on radio frequency ("RF") metrics associated with one or more UEs. RF metrics may include, for example, signal strength metrics such as Received Signal Strength Indicator ("RS SI") metrics, Signal-to-Interference-and-Noise-Ratio ("SINR") metrics, Reference Signal Received Power ("RSRP") metrics, Reference Signal Received Quality ("RSRQ") metrics, Channel Quality Indicator ("CQI") metrics, and/or other suitable metrics. Such RF metrics may relate to communications between a UE and wireless network infrastructure equipment, such as a base station of a RAN, a Distributed Unit ("DU") of a RAN (e.g., in an architecture in which one or more DUs are communicatively coupled to a Central Unit ("CU")), or other wireless network infrastructure equipment.

As discussed herein, the resource allocation of a MEC that is currently providing services to a UE may be modified based on RF metrics associated with the UE, such as a signal strength of wireless communications between the UE and a DU or other wireless network infrastructure with which the MEC is associated with. For example, different DUs of the wireless network may be associated with different MECs, which may be co-located with respective DUs and/or may otherwise be associated with such DUs. As such, the signal strength of a UE and a DU with which a given MEC is associated may be a factor based on which the resource allocation of the MEC, for services associated with the UE, may be modified. For example, as discussed herein, such signal strength may affect wireless performance metrics, such as latency, throughput, jitter, etc. Accordingly, embodiments described herein may modify the resource allocation at the MEC based on the signal strength metrics associated with the UE. For example, in situations where the signal strength is stronger, resource allocation at the MEC may be higher and/or may be increased, and in situations where the signal strength is weaker, resource allocation at the MEC may be lower and/or may be reduced. In this manner, the modification of the resource allocation may have relatively little or no impact on the overall performance of services provided by the MEC, as the signal strength may remain the "limiting factor" on such overall performance.

For example, if a MEC is providing augmented reality ("AR") services to a UE, in which the UE provides image or video data and the MEC provides augmented or enhanced image or video data in response, the MEC may process or generate such augmented or enhanced image or video data at a particular framerate, resolution, video quality, or other parameters. In situations where the signal strength associated with the UE is relatively weak, the resulting wireless performance may have increased latency, and the framerate, resolution, etc. of the augmented or enhanced image or video data may be reduced in order to continue providing a smooth user experience. Such reduction of augmented or enhanced image or video data may have lower resource allocation requirements at the MEC, such as a lower amount of processing power, a lower amount of memory resources, etc. than augmented or enhanced image or video data generated or provided at a higher framerate, resolution, etc. As such reducing the resource allocation, at the MEC, for services provided to a UE that is experiencing lower measures of signal strength may provide the same or similar user experience as would be provided without reducing such resource allocation, but may conserve resources of the MEC as compared to not reducing such resource allocation. Further, since such operations are based on RF metrics such as signal strength, which may be readily available to a DU with which the MEC is associated, such operations may be able to be performed relatively quickly, with relatively lightweight models or other techniques, and/or without involvement of excessive external data sources.

Additionally, as discussed herein, signal strength metrics may be used to determine the likelihood of movement of a UE from the service region of a one MEC (e.g., a "source" MEC) to another MEC (e.g., a "target" MEC), and may accordingly be used to deallocate or "age" resources of the source MEC and/or to "warm" resources of the target MEC.

"Aging" resources, as discussed herein, may refer to the deallocation of resources over time, at a given MEC, that are allocated for providing services associated with a given UE or application. For instance, as discussed herein, if a UE receives services from a MEC, the MEC may have a set of resources (e.g., processing resources, memory resources, etc.) allocated to providing such services to the UE. If the UE begins to move away from the MEC, an "aging" process may be initiated, in which those resources are deallocated over time, thus freeing up those resources for other services. The aging process may include steadily or linearly deallocating the resources over time (e.g., over a period of a minute, an hour, etc.). In some embodiments, the aging process may include deallocating the resources further based on a signal strength of the UE (e.g., signal strength of communications between the UE and a DU associated with the MEC), such as accelerating or decelerating the aging process based on whether the signal strength of the UE is decreasing or increasing, respectively. As similarly discussed above, aging the resources of the MEC based on the signal strength may allow for the freeing up of MEC resources while having minimal or no impact on the performance of the services with respect to the UE, as the signal strength may be the limiting factor on performance in such a scenario.

"Warming" resources, as discussed herein, may refer to the allocation of resources at a given MEC, in order to provide services to a given UE. For example, in situations where the UE moves into or toward a service region associated with a particular MEC, the particular MEC may have been "warmed" ahead of time (e.g., based on decreasing signal strength with respect to a DU associated with a MEC that previously provided services to the UE and/or based on increasing signal strength with respect to a DU associated with the particular MEC).

FIGS. 1A-1F illustrate an example overview of one or more embodiments. As shown in FIG. 1A, a RAN may include wireless network infrastructure, controllers, etc., via which the RAN serves as a wireless interface between one or more UEs, such as UE 101. UE 101 may include, for example, a mobile phone, a tablet, an Internet of Things ("IoT") device, a Machine-to-Machine ("M2M") device, or some other type of device with wireless communication capability. The RAN may include one or more CUs, such as CU 103 and one or more DUs, such as DUs 105-1 and 105-2. CU 103 may serve as a controller for DUs 105 (e.g., may provide instructions to DUs 105 as discussed herein), and/or may serve as an interface between DUs 105 and one or more other devices, systems, or networks, such as a core network associated with the RAN. CU 103 may also serve as an interface between DUs 105 and Resource Modeling System ("RMS") 107, which may perform one or more operations described herein relating to allocating, deallocating, etc. (e.g., "aging" and/or "warming") of resources associated with one or more MECs associated with DUs 105.

For example, as shown, DU 105-1 may be associated with MEC 109-1, and DU 105-2 may be associated with MEC 109-2. MECs 109 may be "associated with" respective DUs 105 inasmuch as particular MECs 109 may be co-located with particular DUs 105, particular MECs 109 may be implemented by some or all of the same hardware as particular DUs 105, and/or particular MECs 109 may otherwise be assigned or associated with particular DUs 105. As such, MECs 109 may each be associated with particular service regions 111. For example, MEC 109-1 may be associated with service region 111-1, and MEC 109-2 may be associated with service region 111-2. Service regions 111 may, for example, correspond to or be based on a coverage area associated with respective DUs 105. For example, DUs 105 may include wireless radio equipment (e.g., one or more antennas) via which DUs 105 may wirelessly communicate with one or more UEs 101. Service regions 111 may indicate geographical regions in which UEs 101 are able to receive wireless communications (e.g., with at least a threshold level of signal strength, channel quality, etc.) from respective DUs 105. In some situations, as shown, service regions 111 of two or more DUs 105 and/or MECs 109 may overlap one another.

In the example of FIG. 1A, UE 101 is located within service region 111-1, associated with DU 105-1 and/or MEC 109-1. UE 101 may further receive services provided by MEC 109-1 via DU 105-1. For example, UE 101 may wirelessly output communications to MEC 109-1 via DU 105-1, and may wirelessly receive communications from MEC 109-1 via DU 105-1. MEC 109-1 may, for example, perform computations on data provided by UE 101, and/or may otherwise generate information to provide to UE 101. As discussed above, for example, MEC 109-1 may provide AR services to UE 101, which may include receiving a video stream from UE 101, generating an augmented video stream based on the provided video stream, and providing the augmented video stream to UE 101 in real time or near-real time.

In order to provide the services to UE 101, resources of MEC 109-1 may have been allocated to one or more applications associated with the service, and/or on behalf of UE 101 accessing the service. For example, a portion of the overall processing resources of MEC 109-1 may have been allocated to the one or more applications, a portion of the overall memory resources of MEC 109-1 may have been allocated to the one or more applications, etc.

As further shown, RMS 107 may monitor RF metrics associated with UE 101, such as a signal strength of communications between UE 101 and DU 105-1. DU 105-1 may provide such monitored metrics to RMS 107 via CU 103, via an application programming interface ("API"), via one or more other DUs 105 (e.g., in a "mesh" topology in which multiple DUs 105 are in communication with each other), and/or via some other suitable communication pathway. Such metrics may be generated or provided by UE 101 (e.g., via one or more measurement reports or other types of communications), by DU 105-1, or some other suitable device or system. As discussed above, RF metrics may include or may be based on SINR metrics, RSSI metrics, RSRP metrics, RSRQ metrics, CQI metrics, etc. Generally, such metrics may indicate or may be referred to as "signal strength" between UE 101 and DU 105-1.

Figure 1B:
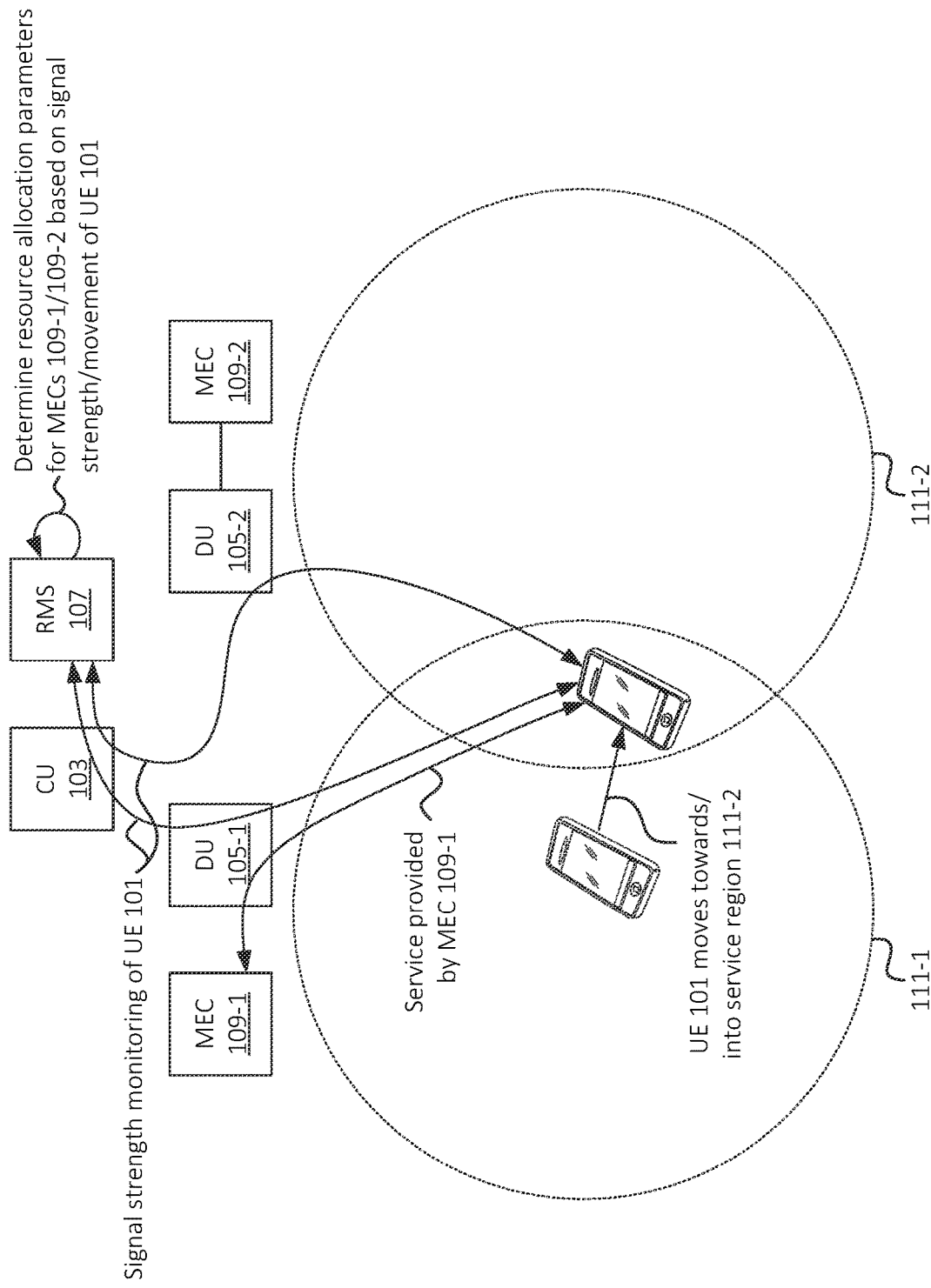

As shown in FIG. 1B, at some point while UE 101 is receiving services from MEC 109-1 (e.g., via DU 105-1), UE 101 may move toward or into service region 111-2, associated with DU 105-2 and/or MEC 109-2. Accordingly, DU 105-2 may detect the presence of UE 101, and/or UE 101 may detect the presence of DU 105-2. For example, UE 101 may detect one or more wireless broadcasts outputted by DU 105-2, such as a System Information Block ("SIB"), a Master Information Block ("MIB"), or some other wireless signal. Additionally, or alternatively, DU 105-2 may receive an indication from UE 101, CU 103, DU 105-1, and/or some other device or system that UE 101 has detected the presence of DU 105-2. Accordingly, DU 105-2, UE 101, and/or some other device or system may monitor the signal strength of communications between UE 101 and DU 105-2.

Figure 2:
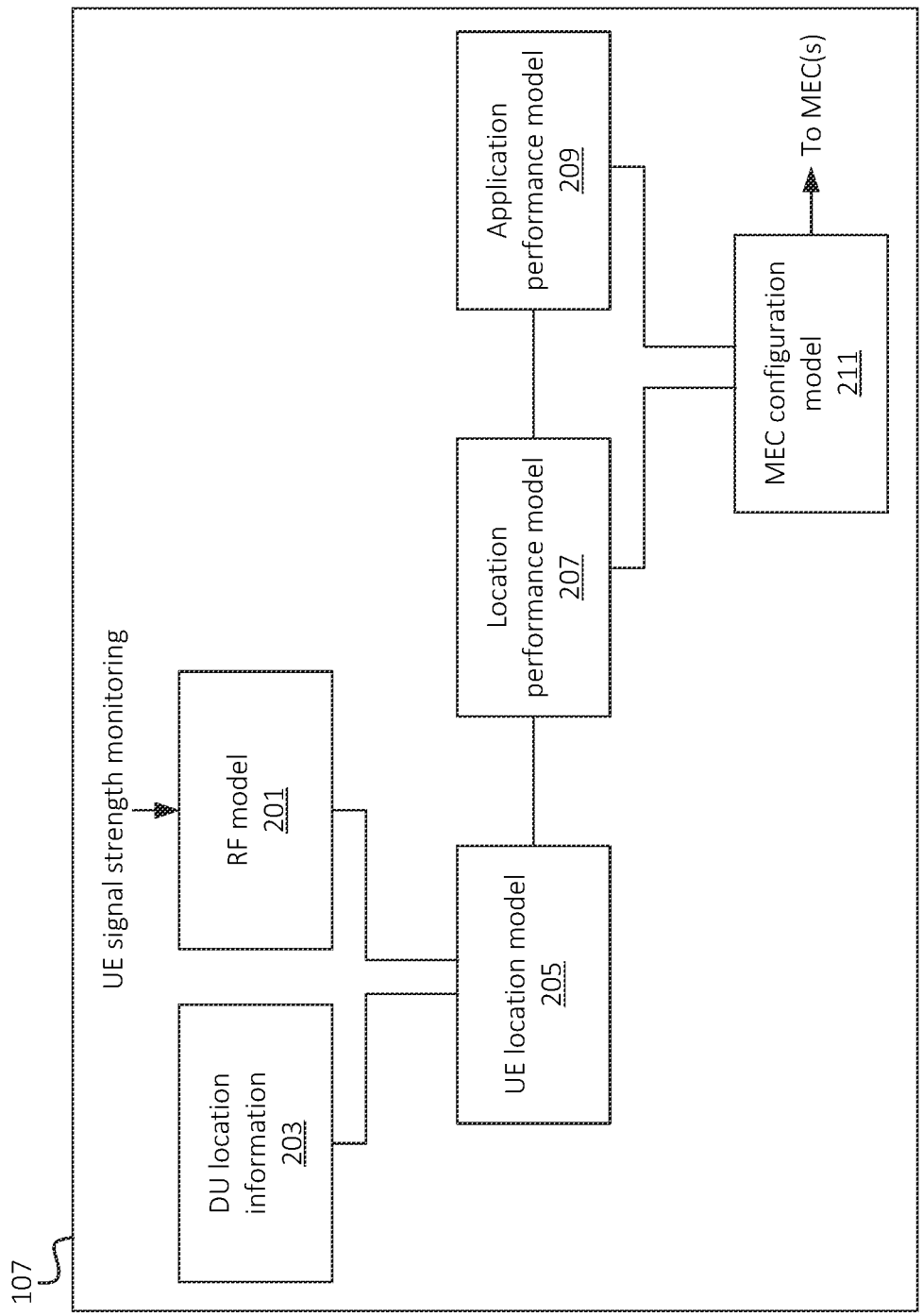
FIG. 2 illustrates an example set of models that may be used to determine MEC configuration parameters, in accordance with some embodiments.

As shown, RMS 107 may receive the monitored signal strength information, associated with communications between UE 101 and DU 105-1, as well as communications between UE 101 and DU 105-2. In this manner, RMS 107 may determine that UE 101 has moved toward DU 105-2. As shown in FIG. 2, RMS 107 may maintain one or more RF models 201 (e.g., statistical models, artificial intelligence/machine learning ("AI/ML") models, and/or other suitable types of models), that associate particular UE signal strength metrics (e.g., time series values of signal strength metrics received over time, values of individual UE signal strength metrics, etc.) to one or more patterns, trends, etc. of signal strength metrics. For example, a first RF model 201 may be associated with a first set of monitored UE signal strength values, such as a relatively weak signal strength followed by a relatively strong signal strength followed by a relatively weak signal strength over the span of 30 minutes, while a second RF model 201 may be associated with a second set of monitored UE signal strength values, such as a relatively strong and unchanging signal strength over the span of 60 minutes. Based on a set of monitored UE signal strength values over time, RMS 107 may determine one or more RF models 201 that are associated with the UE signal strength values.

RMS 107 may also maintain DU location information 203, which may indicate a geographical location of one or more DUs 105. For example, DU location information 203 may include latitude and longitude coordinates, Global Positioning System ("GPS") coordinates, and/or some other type of indication of geographical location of DUs 105. In some embodiments, DU location information 203 may indicate a coverage area of respective DUs 105, which may be indicated as a radius or distance from a location of respective DUs 105, as a shape or region (e.g., circle, oval, irregular shape, etc.), or other indication of the coverage area of respective DUs 105.

RMS 107 may further maintain one or more UE location performance models 205. A particular UE location performance model 205 may indicate, for example, a location or predicted location of UE 101, given a particular RF model 201 and DU location information 203. In some embodiments, a particular set of monitored UE signal strength metrics and/or RF model 201, in concert with location information 203 of a particular DU 105, may be used as inputs to one or more UE location performance models 205 to determine a location of UE 101 and/or to predict a location of UE 101 at a future time.

For example, given a first RF model 201 (or a first particular output of RF model 201, such as a particular pattern, classification, etc. generated based on a set of UE signal strength metrics) and location information 203 regarding a particular DU 105, UE location performance model 205 may indicate that UE 101 is relatively likely to remain within a coverage area of DU 105. As another example, given a second RF model 201 (or a second particular output of RF model 201, such as a different pattern, classification, etc. generated based on a set of UE signal strength metrics), UE location performance model 205 may indicate that UE 101 is relatively likely to move out of the coverage area of DU 105, and/or into the coverage area of another DU 105. As yet another example, given a third RF model 201 (or a third particular output of RF model 201), UE location performance model 205 may indicate that UE 101 is relatively likely to remain in the coverage area of DU 105, but is likely to move to a location that is farther away from DU 105 (e.g., is likely to exhibit weaker signal strength metrics in the future).

RMS 107 may also maintain location performance model 207, which may indicate performance metrics associated with a given location or service region 111. For example, location performance model 207 may be based on historical values of performance metrics associated with services provided by a respective MEC 109 to UEs 101 located within a given service region 111, such as latency metrics, throughput metrics, or the like. For example, location performance model 207 may indicate that a UE located at a particular location may send and/or receive communications to and/or from a given MEC 109 with a particular amount or range of latency, a particular amount or range of throughput, etc.

As shown, one or more location performance models 207, and/or one or more classifications or other outputs of location performance models 207 may be associated with respective UE location performance models 205. For example, a particular UE location performance model 205 may indicate a present location of a given UE 101, and may further predict one or more future locations of UE 101. As such, a first location performance model 207 (and/or a first output of location performance model 207) may be associated with the present location of UE 101, and a second location performance model 207 (and/or a second output of location performance model 207) may be associated with the predicted future location of UE 101. In this manner, the performance of communications between MEC 109 and UE 101 at the present location of UE 101 and/or one or more predicted future locations of UE 101 may be determined, estimated, modeled, predicted, etc. by RMS 107.

RMS 107 may further maintain application performance model 209, which may include performance profiles or other information associated with one or more applications executed by MEC 109 (e.g., applications associated with services provided by MEC 109 to UE 101). The performance profiles may include, for example, frames per second, processing throughput (e.g., calculations or computations per second, minute, etc.), video resolution or quality, or other indication of performance over time associated with an application executed by MEC 109.

RMS 107 may further maintain MEC configuration model 211, which may include resource allocation parameters of MEC 109, such as processor resource allocation parameters, memory resource allocation parameters, or allocation parameters of other resources of MEC 109. Such parameters may be specified in terms of percentage or proportion of total resources of MEC 109, a minimum threshold or amount of resources, or in some other suitable manner. Generally, MEC configuration model 211 may be used to determine a set of resource allocation parameters of MEC 109, in order to provide a level of performance to UE 101 that is served by MEC 109, based on RF metrics associated with the location or predicted location of UE 101 (e.g., as indicated by location performance model 207), as well as based on performance profiles of the application (e.g., as indicated by application performance model 209). In this manner, MEC configuration model 211 may be used to provide application performance in accordance with one or more performance profiles, while taking into account the RF metrics of a location in which UE 101 is located or is predicted to be located. In this manner, the RF metrics associated with UE 101 (e.g., at the present or predicted location) may be used as a factor (e.g., a determining factor) based on which one or more MEC configuration parameters are selected via MEC configuration model 211, as described herein.

One or more of the models discussed above may be generated, modified, refined, etc. using suitable modeling techniques, such as AI/ML techniques. For example, such models may be refined, trained, etc. based on real-world data or feedback information, and/or based on one or more simulations. Further, affinities or associations between models, and/or associations between particular inputs and/or outputs of respective models, may be strengthened, weakened, or otherwise refined over time based on such modeling techniques.

Returning to FIG. 1B, RMS 107 may determine resource allocation parameters for MECs 109-1 and/or 109-2, based on the monitored signal strength of UE 101 as UE 101 moves towards and/or into service region 111-2 from service region 111-1. For example, RMS 107 may determine that UE 101 is relatively (e.g., greater than a threshold) likely to move into, or further into, service region 111-2, and/or that UE 101 is relatively likely to move out of service region 111-1. Accordingly, RMS 107 may determine a set of resource allocation parameters for MECs 109-1 and/or 109-2, to reflect such likelihood.

Figure 1C:
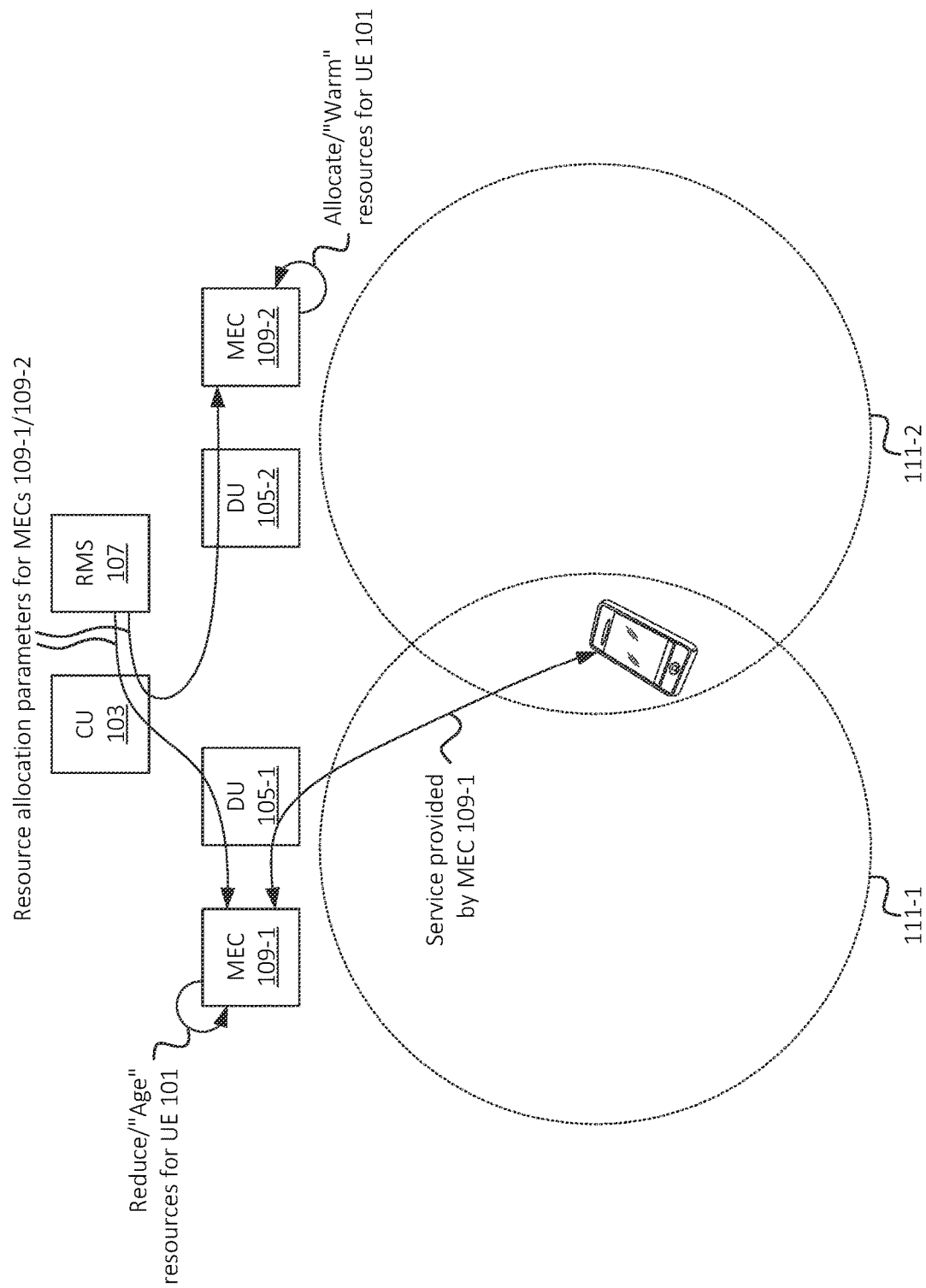

As shown in FIG. 1C, RMS 107 may provide the resource allocation parameters to MECs 109-1 and 109-2. For example, RMS 107 may provide the resource allocation parameters, for MEC 109-1, via CU 103 and/or DU 105-1. Similarly, RMS 107 may provide the resource allocation parameters, for MEC 109-2, via CU 103 and/or DU 105-2. In this example, assume that RMS 107 has determined that UE 101 is relatively likely to exit service region 111-1, and is relatively likely to enter service region 111-2 (e.g., based on one or more location performance models 207 and/or outputs thereof, which may ultimately be determined based on monitored UE signal strength metrics as discussed above). As such, the resource allocation parameters may include parameters to reduce and/or "age" resources, at MEC 109-1, allocated to providing service to UE 101. Additionally, or alternatively, the resource allocation parameters may include parameters to increase, provision, and/or "warm" resources at MEC 109-2, such that UE 101 is able to quickly continue receiving service from MEC 109-2 in the event that UE 101 is handed over to DU 105-2 from DU 105-1, and/or in the event that MEC 109-2 is otherwise assigned to serve UE 101. For example, UE 101 may seamlessly continue to receive service associated with the same application(s) for which MEC 109-1 is currently providing service to MEC 109-1.

In some embodiments, the amount of resources to allocate at MEC 109-2 may be based on the predicted location(s) of UE 101 (e.g., within the next minute, within the next hour, etc. after UE 101 has moved towards service region 111-2, which may be based on one or more outputs of UE location performance model 205), the predicted RF metrics at such location(s) (e.g., which may be based on one or more outputs of location performance model 207), the actual RF metrics associated with UE 101 as monitored by RMS 107, and/or other factors. For example, as discussed above, the amount of resources to allocate at MEC 109-2 may be selected such that a particular level of application performance (e.g., associated with application performance model 209) may be achieved, and further such that RF metrics associated with the actual or predicted location of UE 101 (e.g., as indicated by location performance model 207) may be the limiting factor in the overall application performance, rather than the MEC resource allocation.

For example, if location performance model 207 indicates a particular throughput at a predicted or actual location of UE 101 (e.g., based on historical measures of throughput of UEs that have been located at or near (e.g., within a threshold distance of) such location), location performance model 207 may select a particular MEC configuration model 211 (e.g., a particular MEC resource allocation) that generates an amount of data to transmit to UE 101 based on the particular throughput. For example, the amount of data that is generated by MEC 109-2 based on a reduced resource allocation may be lower than the amount of data that is generated by MEC 109-2 based on a higher resource allocation. The higher resource allocation may include, for example, the capability to perform more computations over a given time period and/or otherwise output a greater amount of data to UE 101 over a given time period. On the other hand, MEC 109-2 may be able to utilize a reduced resource allocation in order to provide data at a slower rate, and/or to otherwise provide less data to UE 101, in accordance with the RF metrics (or predicted RF metrics) associated with UE 101 at the actual or predicted location of UE 101.

For example, the application performance (e.g., as indicated by application performance model 209) may be less impacted by MEC resource allocations in situations where RF performance is relatively low, and is therefore a limiting factor in overall end-to-end performance experienced by UE 101. For example, even in situations where MEC 109-2 is allocated a relatively large proportion of resources for UE 101 and therefore is able to generate relatively large amounts of service traffic for UE 101, a relatively low measure of RF performance (e.g., low signal strength) may introduce delays, reduce throughput, etc., such that the increased processing by MEC 109-2 (e.g., as provided by the relatively high resource allocation) may not result in an increase in performance experienced by UE 101.

Similarly, an amount of the reduction of resources at MEC 109-1 may be based on actual or predicted signal strength between UE and DU 105-1 (e.g., based on an actual present location of UE 101 and/or a predicted location of UE 101). Additionally, a rate of "aging" of the resources associated with MEC 109-1 may be based on actual or predicted signal strength between UE and DU 105-1. For example, if the actual or predicted RF metrics between UE 101 and DU 105-1 are relatively high, then the aging rate may be slower (e.g., resources of MEC 109-1, allocated for UE 101, may be deallocated at a relatively slower rate), whereas if the actual or predicted RF metrics between UE 101 and DU 105-1 are relatively low, then the aging rate may be faster.

Figure 1D:
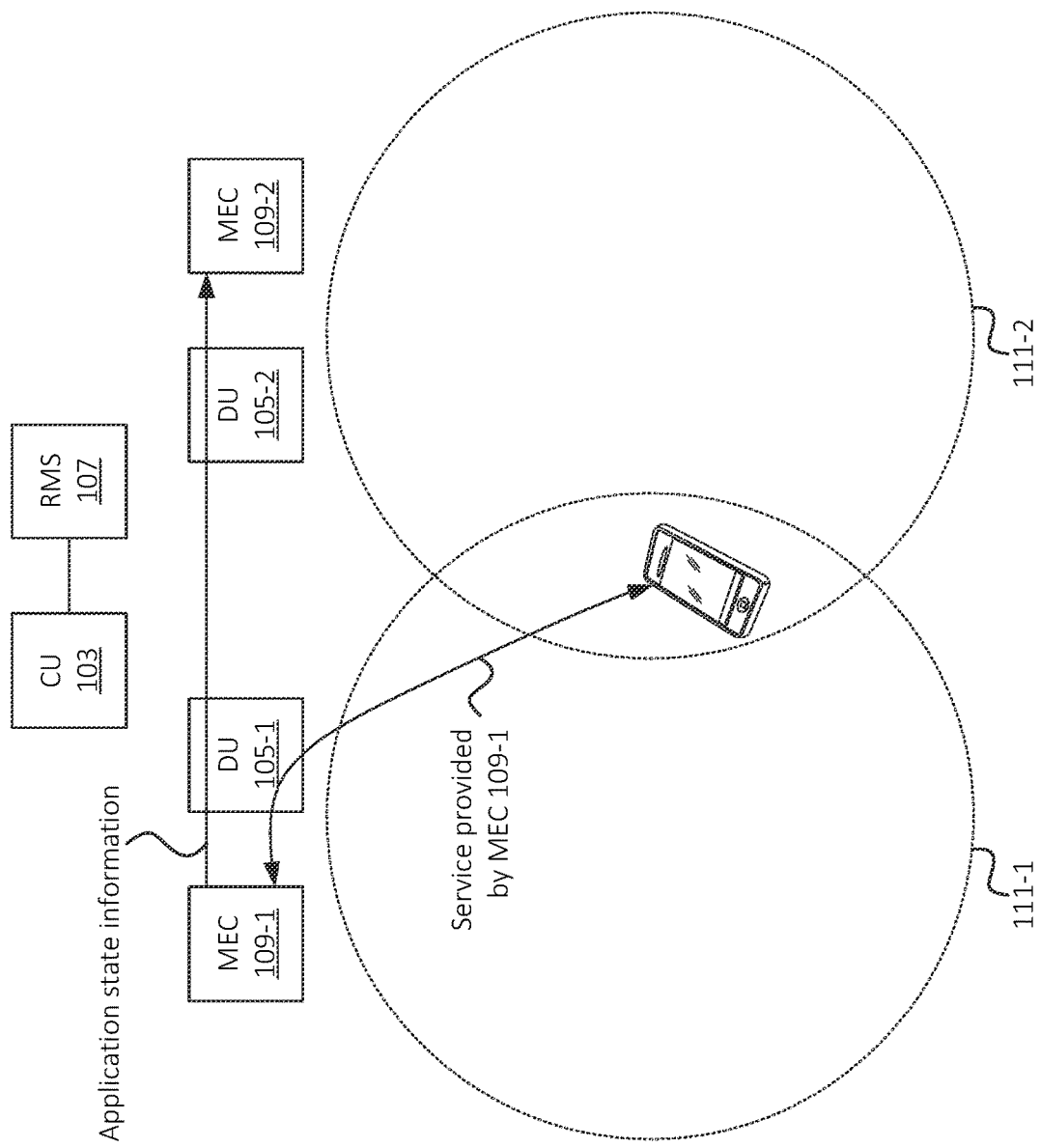

In some embodiments, when detecting that UE 101 is moving towards or into service region 111-2, RMS 107 may instruct MEC 109-1 to provide an application state associated with one or more services provided to UE 101 to MEC 109-2. For example, as shown in FIG. 1D, MEC 109-1 may provide such information to MEC 109-2 via an inter-MEC interface, via DUs 105-1 and 105-2, via CU 103, and/or some other suitable communication pathway. In some embodiments, MEC 109-1 may update MEC 109-2 with the application state in real time or on an ongoing basis, such that MEC 109-2 is able to seamlessly continuing providing the same services to UE 101.

Figure 1E:
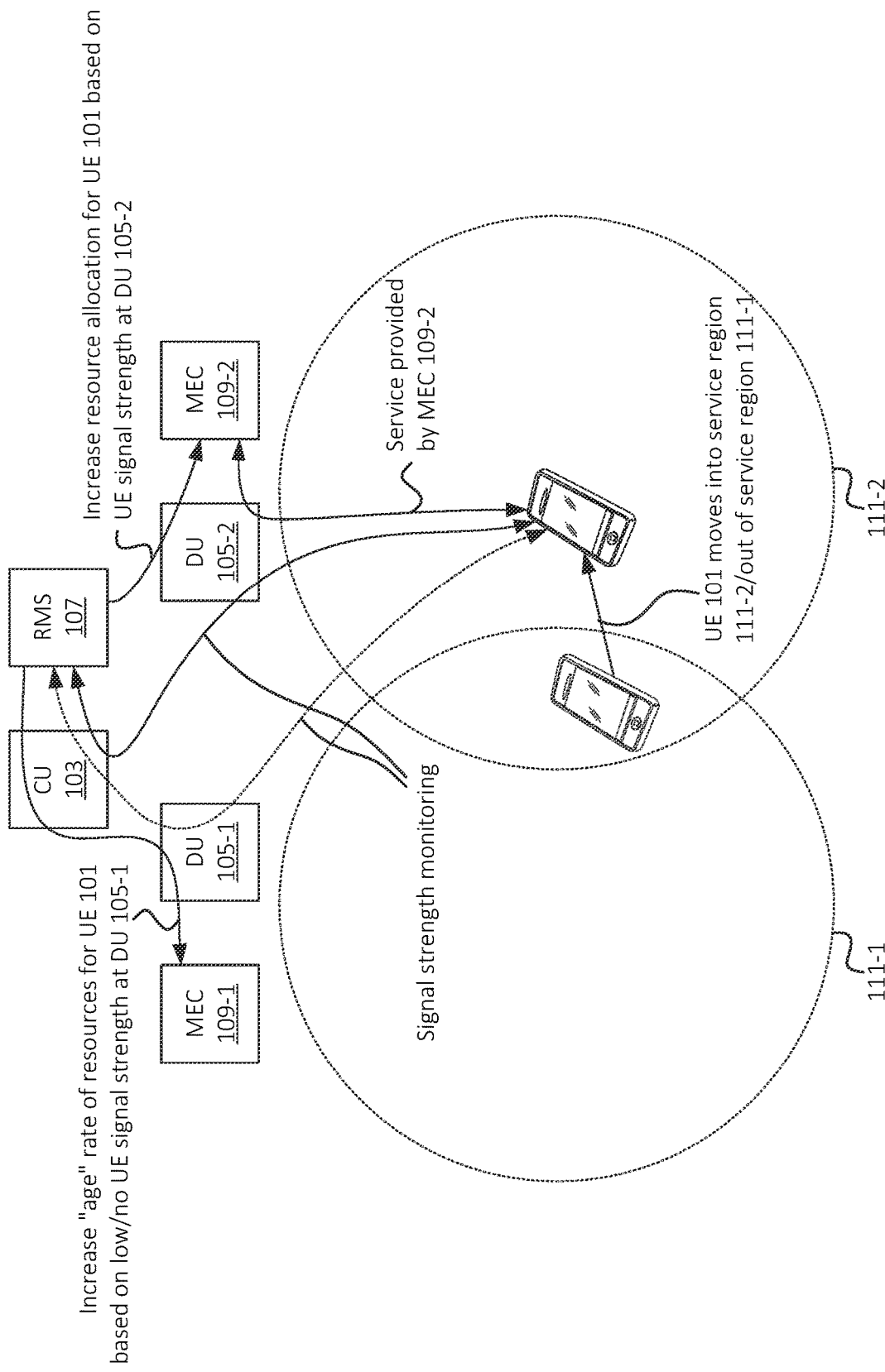

As shown in the example of FIG. 1E, UE 101 may move further into service region 111-2, and may move out of service region 111-1. As such, RMS 107 may detect (as indicated by the dashed line in the figure) that signal strength between UE 101 and DU 105-1 is zero or low (e.g., below a threshold). As such, RMS 107 may further increase an aging rate of resources, for UE 101, allocated at MEC 109-1, and/or may deallocate some or all of such resources at MEC 109-1. Similarly, RMS 107 may increase a resource allocation for UE 101 at MEC 109-2, based on the increase signal strength between UE 101 and DU 105-2.

Figure 1F:
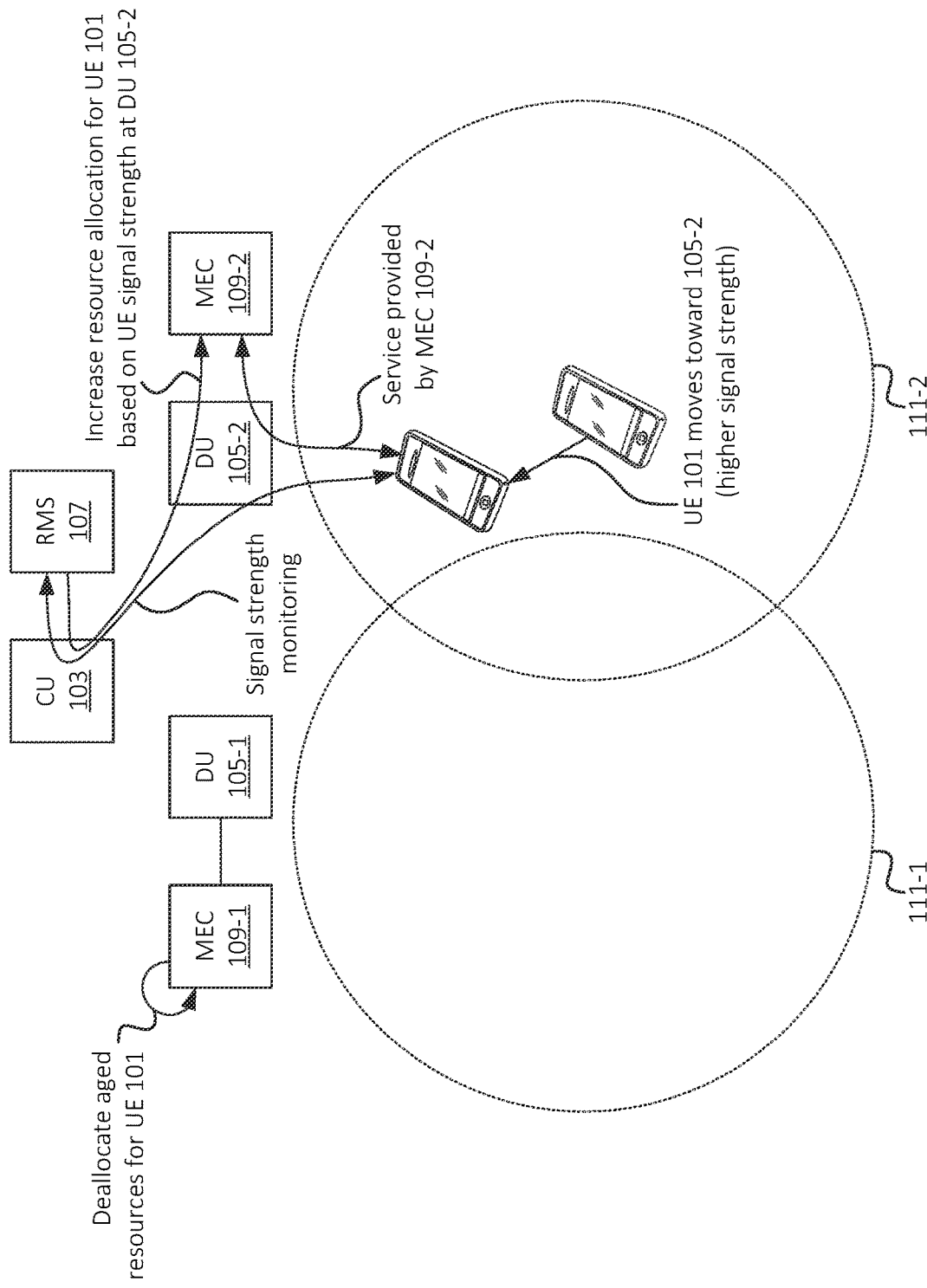

As shown in FIG. 1F, UE 101 may, after some time, move close to DU 105-2, and/or may otherwise move to a location within service region 111-2 such that signal strength of communications between UE 101 and DU 105-2 increases. Based on the increased signal strength, RMS 107 may instruct MEC 109-2 to increase a resource allocation associated with UE 101, as the increased signal strength may be associated with lower latency and/or higher throughput available for communications between UE 101 and DU 105-2. Further, MEC 109-1 may deallocate aged resources for UE 101, as an amount of time associated with the aging process may have elapsed without UE 101 returning to service region 111-1.

While examples discussed above are in the context of certain communications being handled by CU 103 and/or traversing CU 103, in some embodiments, other suitable communication pathways may be used between devices or systems discussed above. For example, as noted above, DUs 105 may be deployed in a "mesh" arrangement, whereby DUs 105 may communicate with each other without such communications being handled by, or directed to, CU 103. Additionally, or alternatively, RMS 107 and/or one or more other devices or systems may communicate with one or more DUs 105 directly, and/or via one or more other DUs 105 (e.g., a route between RMS 107 and a particular DU 105 may include one or more other DUs 105).

Figure 3:
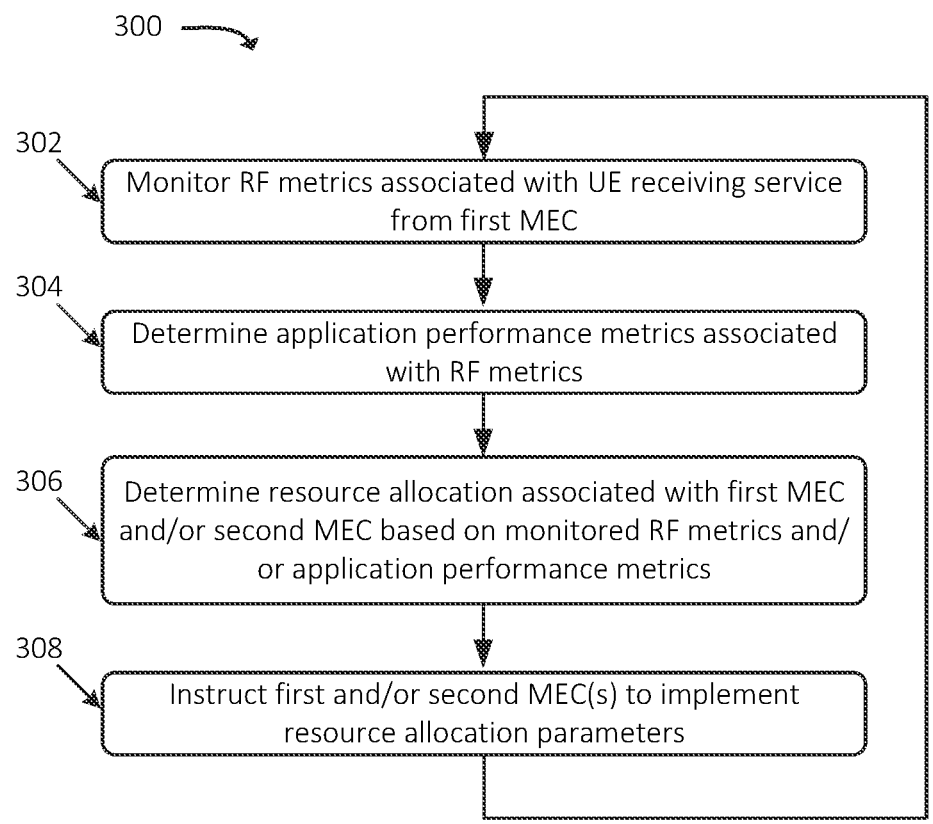
FIG. 3 illustrates an example process for dynamically allocating and/or deallocating MEC resources between signal strength metrics, in accordance with some embodiments.

FIG. 3 illustrates an example process 300 for dynamically allocating and/or deallocating MEC resources based on RF metrics, in accordance with some embodiments. In some embodiments, some or all of process 300 may be performed by RMS 107. In some embodiments, one or more other devices may perform some or all of process 300 in concert with, and/or in lieu of, RMS 107.

As shown, process 300 may include monitoring (at 302) RF metrics associated with UE 101 receiving service from a first MEC 109. For example, as discussed above, RMS 107 may monitor (e.g., via a particular DU 105 with which MEC 109 is associated, via CU 103 that is communicatively coupled to DU 105, and/or some other device or system) RF metrics associated communications between UE 101 and DU 105. As discussed above, such RF metrics may include signal strength metrics, channel quality metrics, or the like. In some embodiments, as discussed above, RMS 107 may determine one or more RF models 201 (and/or one or more outputs thereof) based on the RF metrics. In some embodiments, RMS 107 may determine one or more UE location performance models 205 (and/or one or more outputs thereof) based on RF model 201 (e.g., an output of RF model 201) and/or based on a location of DU 105.

As discussed above, RMS 107 may determine one or more location performance models 207 based on the location of UE 205 (e.g., which may be determined or estimated based on the signal strength metrics and the location of DU 105, as discussed above), such as the actual or predicted location of UE 101. As discussed above, the location performance models 207 may indicate actual or predicted RF metrics at the actual or predicted location of UE 101, and may have been generated and/or refined based on historical information regarding UEs that have been located at such locations.

and/or based on location information 203 associated with DU 105.

Process 300 may further include determining (at 304) application performance metrics associated with the RF metrics. For example, as discussed above, RMS 107 may determine one or more application performance models 209, which may include application performance profiles or other suitable information that may be associated with or correlated with RF metrics at given actual or predicted locations of UE 101. Application performance models may include attributes or information such as video framerate, video resolution, amount of computations to perform in a given timeframe, etc. For example, RMS 107 may identify a set of application performance parameters that are not limited by RF metrics associated with the actual or predicted location of UE 101. As one example, if the RF metrics at a given location are relatively low, RMS 107 may determine a set of application performance parameters such as a relatively low framerate, a relatively low video resolution, etc. As another example, if the RF metrics at a given location are relatively high, RMS 107 may determine a set of application performance parameters such as a relatively high framerate, a relatively high video resolution, etc.

Process 300 may additionally include determining (at 306) a resource allocation associated with the first MEC 109 and/or a second MEC 109 based on the monitored RF metrics and/or the application performance metrics. For example, as discussed above, RMS 107 may determine an amount or proportion of resources of the first MEC 109 that are able to provide a measure application performance determined with respect to the RF metrics at an actual or predicted location of UE 101. For example, RMS 107 may determine an amount or proportion of MEC resources (e.g., of the first MEC 109 and/or the second MEC 109) that are able to provide video at a given framerate, resolution, etc., which may be determined as being associated with the RF metrics at the actual or predicted location of UE 101.

The first MEC 109 may be, for example, a MEC from which UE 101 is currently receiving services, and the second MEC 109 may be a MEC that is associated with a particular DU 105 towards which UE 101 is moving. As discussed above, determining the resource allocation may include determining that the second MEC 109 should be "warmed" such that UE 101 may seamlessly receive service from MEC 109, and the amount of resources to be "warmed" at the second MEC 109 may be based on the actual or predicted RF metrics associated with UE 101 and a DU 105 with which MEC 109 is associated. As also discussed above, determining the resource allocation may include determining that resources of the first MEC 109 should be "aged," which may include steadily decreasing the resource allocation of the first MEC 109 (allocated to providing services to UE 101) over time, decreasing such resource allocation at "steps" or intervals, and/or deallocating such resources after expiration of a timer. In some embodiments, determining the resource allocation may include accelerating or decelerating such aging process, such as increasing or reducing the duration of the timer, increasing or decreasing the aging rate of the resources, etc.

Process 300 may also include instructing (at 308) the first and/or second MECs 109 to implement the resource allocation parameters. For example, RMS 107 may, via CU 103, DUs 105, and/or some other device or system, provide the determined resource allocation parameters to MECs 109. MECs 109 may accordingly implement the resource allocation parameters, which may include increasing or decreasing an amount of resources allocated to providing the one or more services to UE 101, providing state information associated with such services from one MEC 109 to another, starting an "aging" timer, etc. In this manner, the amount of resources allocated to services provided to UE 101 may be determined in accordance with actual or predicted RF metrics associated with UE 101 and one or more DUs 105 with which such MECs 109 are associated, thus efficiently allocating the resources of MECs 109 without negatively impacting the performance of services provided by MECs 109.

Figure 4:
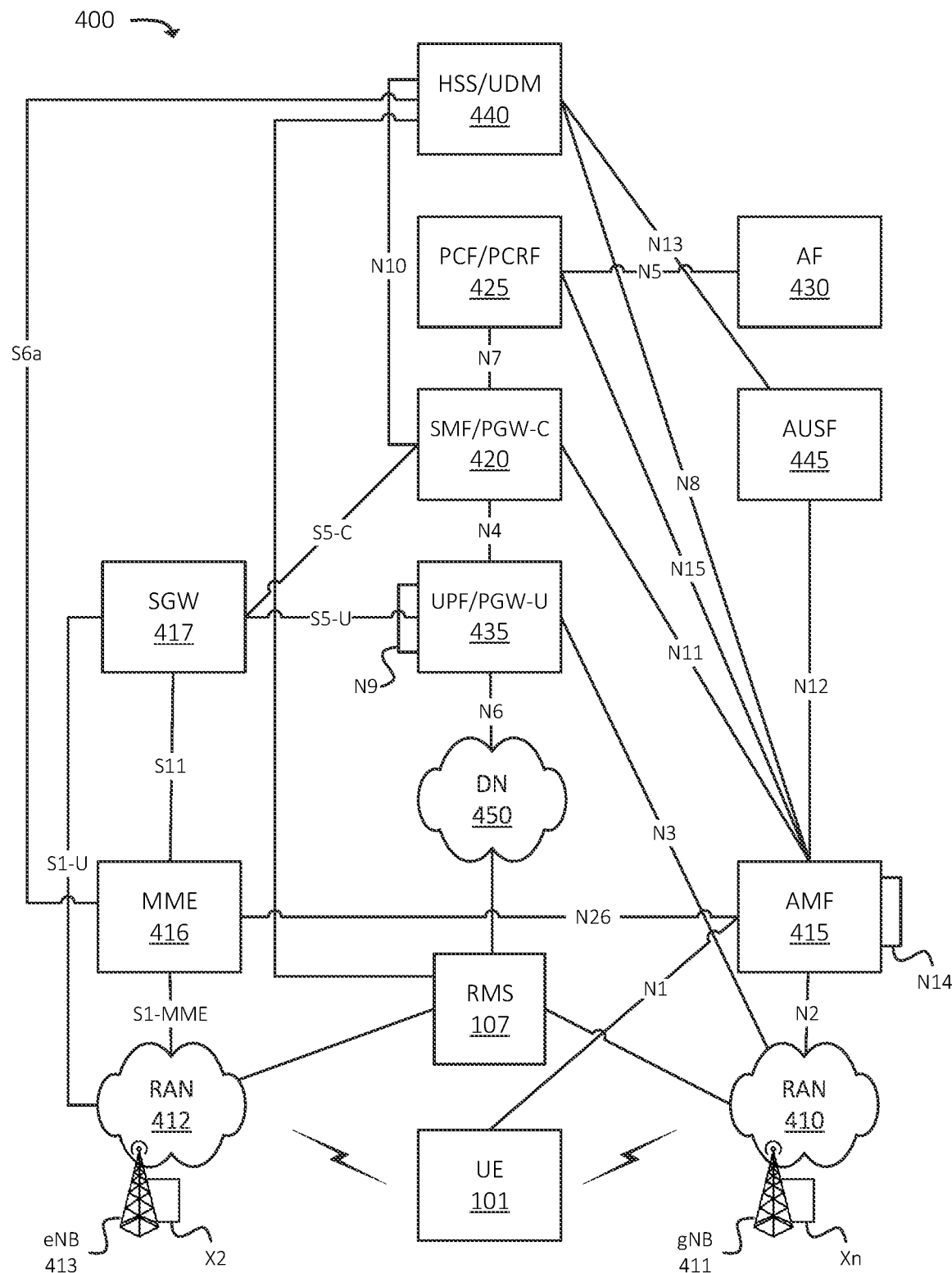
FIG. 4 illustrates an example environment in which one or more embodiments, described herein, may be implemented.

FIG. 4 illustrates an example environment 400, in which one or more embodiments may be implemented. In some embodiments, environment 400 may correspond to a Fifth Generation ("5G") network, and/or may include elements of a 5G network. In some embodiments, environment 400 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 400 may include UE 101, RAN 410 (which may include one or more Next Generation Node Bs ("gNBs") 411), RAN 412 (which may include one or more evolved Node Bs ("eNBs") 413), and various network functions such as Access and Mobility Management Function ("AMF") 415, Mobility Management Entity ("MME") 416, Serving Gateway ("SGW") 417, Session Management Function ("SMF")/Packet Data Network ("PDN") Gateway ("PGW")-Control plane function ("PGW-C") 420, Policy Control Function ("PCF")/Policy Charging and Rules Function ("PCRF") 425, Application Function ("AF") 430, User Plane Function ("UPF")/PGW-User plane function ("PGW-U") 435, Home Subscriber Server ("HSS")/Unified Data Management ("UDM") 440, and Authentication Server Function ("AUSF") 445. Environment 400 may also include one or more networks, such as Data Network ("DN") 450. Environment 400 may include one or more additional devices or systems communicatively coupled to one or more networks (e.g., DN 450), such as RMS 107.

The example shown in FIG. 4 illustrates one instance of each network component or function (e.g., one instance of SMF/PGW-C 420, PCF/PCRF 425, UPF/PGW-U 435, HSS/UDM 440, and/or AUSF 445). In practice, environment 400 may include multiple instances of such components or functions. For example, in some embodiments, environment 400 may include multiple "slices" of a core network, where each slice includes a discrete set of network functions (e.g., one slice may include a first instance of SMF/PGW-C 420, PCF/PCRF 425, UPF/PGW-U 435, HSS/UDM 440, and/or AUSF 445, while another slice may include a second instance of SMF/PGW-C 420, PCF/PCRF 425, UPF/PGW-U 435, HSS/UDM 440, and/or AUSF 445). The different slices may provide differentiated levels of service, such as service in accordance with different Quality of Service ("QoS") parameters.

The quantity of devices and/or networks, illustrated in FIG. 4, is provided for explanatory purposes only. In practice, environment 400 may include additional devices and/or networks, fewer devices and/or networks, different devices and/or networks, or differently arranged devices and/or networks than illustrated in FIG. 4. For example, while not shown, environment 400 may include devices that facilitate or enable communication between various components shown in environment 400, such as routers, modems, gateways, switches, hubs, etc. Alternatively, or additionally, one or more of the devices of environment 400 may perform one or more network functions described as being performed by another one or more of the devices of environment 400. Devices of environment 400 may interconnect with each other and/or other devices via wired connections, wireless connections, or a combination of wired and wireless connections. In some implementations, one or more devices of environment 400 may be physically integrated in, and/or may be physically attached to, one or more other devices of environment 400.

UE 101 may include a computation and communication device, such as a wireless mobile communication device that is capable of communicating with RAN 410, RAN 412, and/or DN 450. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 101 may send traffic to and/or receive traffic (e.g., user plane traffic) from DN 450 via RAN 410, RAN 412, and/or UPF/PGW-U 435.

RAN 410 may be, or may include, a 5G RAN that includes one or more base stations (e.g., one or more gNBs 411), via which UE 101 may communicate with one or more other elements of environment 400. UE 101 may communicate with RAN 410 via an air interface (e.g., as provided by gNB 411). For instance, RAN 410 may receive traffic (e.g., voice call traffic, data traffic, messaging traffic, signaling traffic, etc.) from UE 101 via the air interface, and may communicate the traffic to UPF/PGW-U 435, and/or one or more other devices or networks. Similarly, RAN 410 may receive traffic intended for UE 101 (e.g., from UPF/PGW-U 435, AMF 415, and/or one or more other devices or networks) and may communicate the traffic to UE 101 via the air interface.

RAN 412 may be, or may include, a LTE RAN that includes one or more base stations (e.g., one or more eNBs 413), via which UE 101 may communicate with one or more other elements of environment 400. UE 101 may communicate with RAN 412 via an air interface (e.g., as provided by eNB 413). For instance, RAN 410 may receive traffic (e.g., voice call traffic, data traffic, messaging traffic, signaling traffic, etc.) from UE 101 via the air interface, and may communicate the traffic to UPF/PGW-U 435, and/or one or more other devices or networks. Similarly, RAN 410 may receive traffic intended for UE 101 (e.g., from UPF/PGW-U 435, SGW 417, and/or one or more other devices or networks) and may communicate the traffic to UE 101 via the air interface.

AMF 415 may include one or more devices, systems, Virtualized Network Functions ("VNFs"), Cloud-Native Network Functions ("CNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 410 and/or gNBs 411, and/or to perform other operations. In some embodiments, the 5G network may include multiple AMFs 415, which communicate with each other via the N14 interface (denoted in FIG. 4 by the line marked "N14" originating and terminating at AMF 415).

MME 416 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 412 and/or eNBs 413, and/or to perform other operations.

SGW 417 may include one or more devices, systems, VNFs, CNFs, etc., that aggregate traffic received from one or more eNBs 413 and send the aggregated traffic to an external network or device via UPF/PGW-U 435. Additionally, SGW 417 may aggregate traffic received from one or more UPF/PGW-Us 435 and may send the aggregated traffic to one or more eNBs 413. SGW 417 may operate as an anchor for the user plane during inter-eNB handovers and as an anchor for mobility between different telecommunication networks or RANs (e.g., RANs 410 and 412).

SMF/PGW-C 420 may include one or more devices, systems, VNFs, CNFs, etc., that gather, process, store, and/or provide information in a manner described herein. SMF/PGW-C 420 may, for example, facilitate the establishment of communication sessions on behalf of UE 101. In some embodiments, the establishment of communications sessions may be performed in accordance with one or more policies provided by PCF/PCRF 425.

PCF/PCRF 425 may include one or more devices, systems, VNFs, CNFs, etc., that aggregate information to and from the 5G network and/or other sources. PCF/PCRF 425 may receive information regarding policies and/or subscriptions from one or more sources, such as subscriber databases and/or from one or more users (such as, for example, an administrator associated with PCF/PCRF 425).

AF 430 may include one or more devices, systems, VNFs, CNFs, etc., that receive, store, and/or provide information that may be used in determining parameters (e.g., quality of service parameters, charging parameters, or the like) for certain applications.

UPF/PGW-U 435 may include one or more devices, systems, VNFs, CNFs, etc., that receive, store, and/or provide data (e.g., user plane data). For example, UPF/PGW-U 435 may receive user plane data (e.g., voice call traffic, data traffic, etc.), destined for UE 101, from DN 450, and may forward the user plane data toward UE 101 (e.g., via RAN 410, SMF/PGW-C 420, and/or one or more other devices). In some embodiments, multiple UPFs 435 may be deployed (e.g., in different geographical locations), and the delivery of content to UE 101 may be coordinated via the N9 interface (e.g., as denoted in FIG. 4 by the line marked "N9" originating and terminating at UPF/PGW-U 435). Similarly, UPF/PGW-U 435 may receive traffic from UE 101 (e.g., via RAN 410, SMF/PGW-C 420, and/or one or more other devices), and may forward the traffic toward DN 450. In some embodiments, UPF/PGW-U 435 may communicate (e.g., via the N4 interface) with SMF/PGW-C 420, regarding user plane data processed by UPF/PGW-U 435.

HSS/UDM 440 and AUSF 445 may include one or more devices, systems, VNFs, CNFs, etc., that manage, update, and/or store, in one or more memory devices associated with AUSF 445 and/or HSS/UDM 440, profile information associated with a subscriber. AUSF 445 and/or HSS/UDM 440 may perform authentication, authorization, and/or accounting operations associated with the subscriber and/or a communication session with UE 101.

DN 450 may include one or more wired and/or wireless networks. For example, DN 450 may include an Internet Protocol ("IP")-based PDN, a wide area network ("WAN") such as the Internet, a private enterprise network, and/or one or more other networks. UE 101 may communicate, through DN 450, with data servers, other UEs 101, and/or to other servers or applications that are coupled to DN 450. DN 450 may be connected to one or more other networks, such as a public switched telephone network ("PSTN"), a public land mobile network ("PLMN"), and/or another network. DN 450 may be connected to one or more devices, such as content providers, applications, web servers, and/or other devices, with which UE 101 may communicate.

Figure 5:
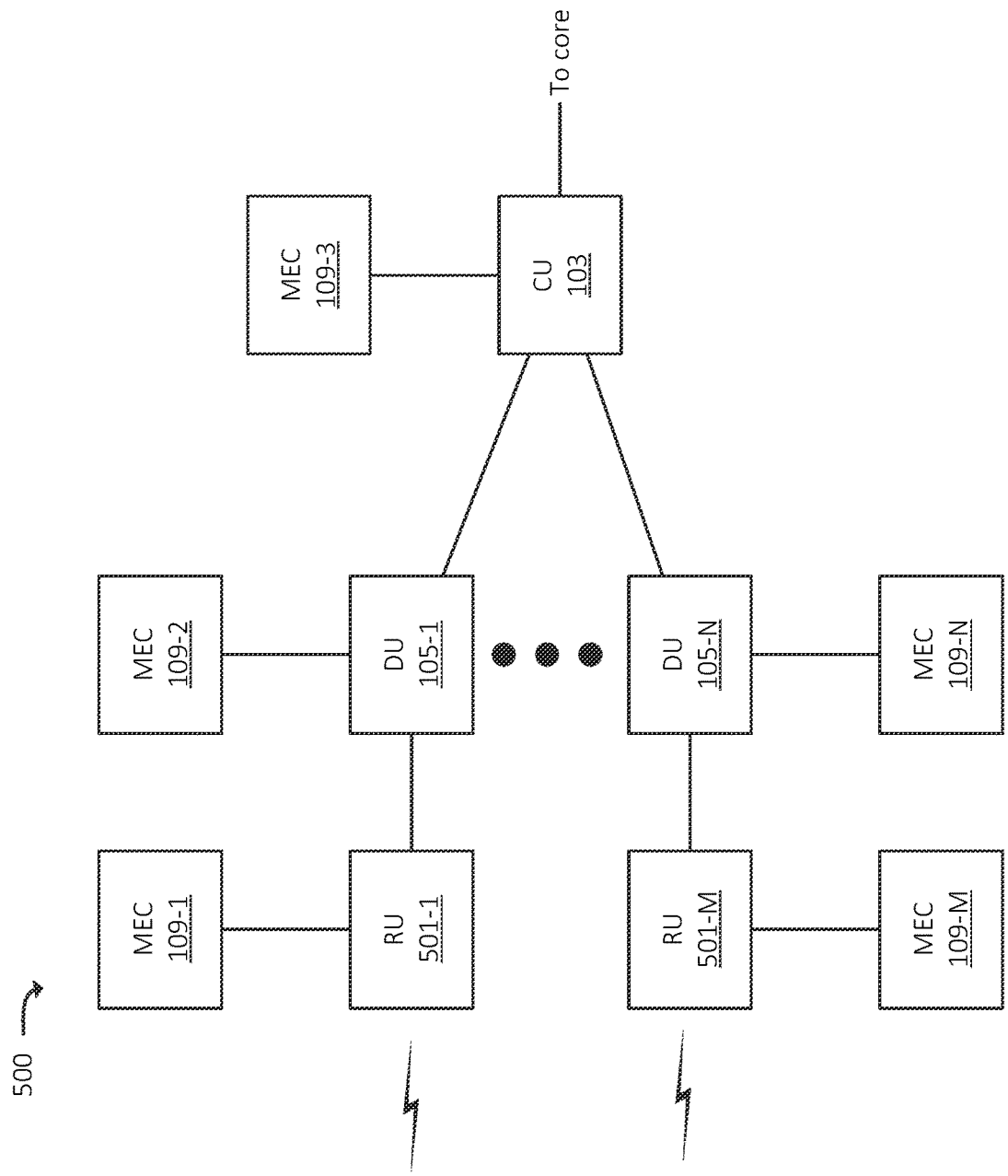
FIG. 5 illustrates an example arrangement of a radio access network ("RAN"), in accordance with some embodiments.

FIG. 5 illustrates an example Distributed Unit ("DU") network 500, which may be included in and/or implemented by one or more RANs (e.g., RAN 410, RAN 412, or some other RAN). In some embodiments, a particular RAN may include one DU network 500. In some embodiments, a particular RAN may include multiple DU networks 500. In some embodiments, DU network 500 may correspond to a particular gNB 411 of a 5G RAN (e.g., RAN 410). In some embodiments, DU network 500 may correspond to multiple gNBs 411. In some embodiments, DU network 500 may correspond to one or more other types of base stations of one or more other types of RANs. As shown, DU network 500 may include Central Unit ("CU") 103, one or more Distributed Units ("DUs") 105-1 through 105-N (referred to individually as "DU 105," or collectively as "DUs 105"), and one or more Radio Units ("RUs") 501-1 through 501-M (referred to individually as "RU 501," or collectively as "RUs 501").

CU 103 may communicate with a core of a wireless network (e.g., may communicate with one or more of the devices or systems described above with respect to FIG. 4, such as AMF 415 and/or UPF/PGW-U 435). In the uplink direction (e.g., for traffic from UEs 101 to a core network), CU 103 may aggregate traffic from DUs 105, and forward the aggregated traffic to the core network. In some embodiments, CU 103 may receive traffic according to a given protocol (e.g., Radio Link Control ("RLC")) from DUs 105, and may perform higher-layer processing (e.g., may aggregate/process RLC packets and generate Packet Data Convergence Protocol ("PDCP") packets based on the RLC packets) on the traffic received from DUs 105.

In accordance with some embodiments, CU 103 may receive downlink traffic (e.g., traffic from the core network) for a particular UE 101, and may determine which DU(s) 105 should receive the downlink traffic. DU 105 may include one or more devices that transmit traffic between a core network (e.g., via CU 103) and UE 101 (e.g., via a respective RU 501). DU 105 may, for example, receive traffic from RU 501 at a first layer (e.g., physical ("PHY") layer traffic, or lower PHY layer traffic), and may process/aggregate the traffic to a second layer (e.g., upper PHY and/or RLC). DU 105 may receive traffic from CU 103 at the second layer, may process the traffic to the first layer, and provide the processed traffic to a respective RU 501 for transmission to UE 101.

RU 501 may include hardware circuitry (e.g., one or more RF transceivers, antennas, radios, and/or other suitable hardware) to communicate wirelessly (e.g., via an RF interface) with one or more UEs 101, one or more other DUs 105 (e.g., via RUs 501 associated with DUs 105), and/or any other suitable type of device. In the uplink direction, RU 501 may receive traffic from UE 101 and/or another DU 105 via the RF interface and may provide the traffic to DU 105. In the downlink direction, RU 501 may receive traffic from DU 105, and may provide the traffic to UE 101 and/or another DU 105.

RUs 501 may, in some embodiments, be communicatively coupled to one or more MEC 109. For example, RU 501-1 may be communicatively coupled to MEC 109-1, RU 501-M may be communicatively coupled to MEC 109-M, DU 105-1 may be communicatively coupled to MEC 109-2, DU 105-N may be communicatively coupled to MEC 109-N, CU 103 may be communicatively coupled to MEC 109-3, and so on. MECs 109 may include hardware resources (e.g., configurable or provisionable hardware resources) that may be configured to provide services and/or otherwise process traffic to and/or from UE 101, via a respective RU 501.

For example, RU 501-1 may route some traffic, from UE 101, to MEC 109-1 instead of to a core network (e.g., via DU 105 and CU 103). MEC 109-1 may process the traffic, perform one or more computations based on the received traffic, and may provide traffic to UE 101 via RU 501-1. In this manner, ultra-low latency services may be provided to UE 101, as traffic does not need to traverse DU 105, CU 103, and an intervening backhaul network between DU network 500 and the core network. In some embodiments, MEC 109 may include, and/or may implement, some or all of the functionality described above with respect to UPF 435 and/or one or more other devices, systems, VNFs, CNFs, etc.

Figure 6:
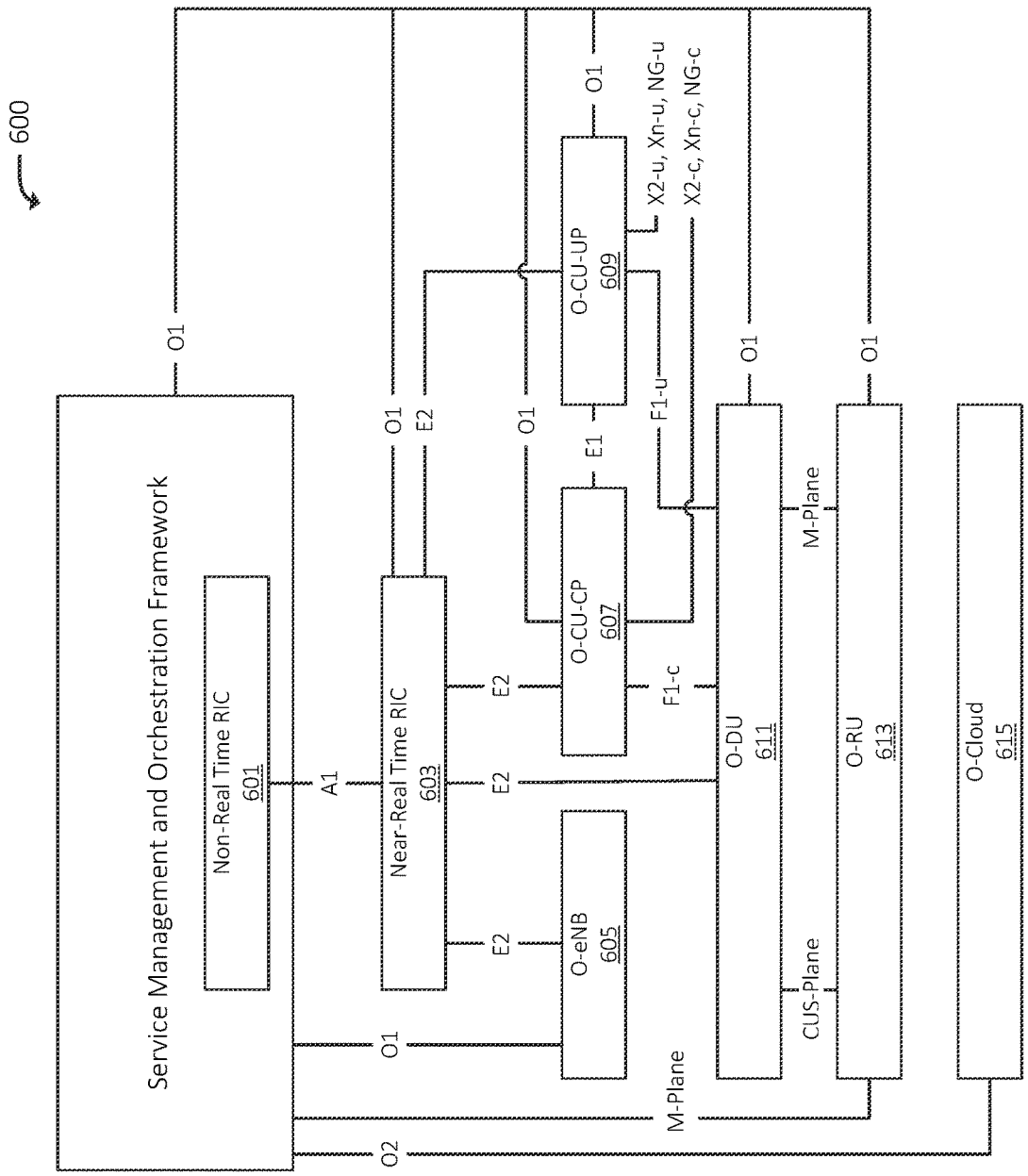
FIG. 6 illustrates an example arrangement of an Open RAN ("O-RAN") environment in which one or more embodiments, described herein, may be implemented.

FIG. 6 illustrates an example O-RAN environment 600, which may correspond to RAN 410, RAN 412, and/or DU network 500. For example, RAN 410, RAN 412, and/or DU network 500 may include one or more instances of O-RAN environment 600, and/or one or more instances of O-RAN environment 600 may implement RAN 410, RAN 412, DU network 500, and/or some portion thereof. As shown, O-RAN environment 600 may include Non-Real Time Radio Intelligent Controller ("RIC") 601, Near-Real Time RIC 603, O-eNB 605, O-CU-Control Plane ("O-CU-CP") 607, O-CU-User Plane ("O-CU-UP") 609, O-DU 611, O-RU 613, and O-Cloud 615. In some embodiments, O-RAN environment 600 may include additional, fewer, different, and/or differently arranged components.

In some embodiments, some or all of the elements of O-RAN environment 600 may be implemented by one or more configurable or provisionable resources, such as virtual machines, cloud computing systems, physical servers, and/or other types of configurable or provisionable resources. In some embodiments, some or all of O-RAN environment 600 may be implemented by, and/or communicatively coupled to, one or more MECs 109.

Non-Real Time RIC 601 and Near-Real Time RIC 603 may receive performance information (and/or other types of information) from one or more sources, and may configure other elements of O-RAN environment 600 based on such performance or other information. For example, Near-Real Time RIC 603 may receive performance information, via one or more E2 interfaces, from O-eNB 605, O-CU-CP 607, and/or O-CU-UP 609, and may modify parameters associated with O-eNB 605, O-CU-CP 607, and/or O-CU-UP 609 based on such performance information. Similarly, Non-Real Time RIC 601 may receive performance information associated with O-eNB 605, O-CU-CP 607, O-CU-UP 609, and/or one or more other elements of O-RAN environment 600 and may utilize machine learning and/or other higher level computing or processing to determine modifications to the configuration of O-eNB 605, O-CU-CP 607, O-CU-UP 609, and/or other elements of O-RAN environment 600. In some embodiments, Non-Real Time RIC 601 may generate machine learning models based on performance information associated with O-RAN environment 600 or other sources, and may provide such models to Near-Real Time RIC 603 for implementation.

O-eNB 605 may perform functions similar to those described above with respect to eNB 413. For example, O-eNB 605 may facilitate wireless communications between UE 101 and a core network. O-CU-CP 607 may perform control plane signaling to coordinate the aggregation and/or distribution of traffic via one or more DUs 105, which may include and/or be implemented by one or more O-DUs 611, and O-CU-UP 609 may perform the aggregation and/or distribution of traffic via such DUs 105 (e.g., O-DUs 611). O-DU 611 may be communicatively coupled to one or more RUs 501, which may include and/or may be implemented by one or more O-RUs 613. In some embodiments, O-Cloud 615 may include or be implemented by one or more MECs 109, which may provide services, and may be communicatively coupled, to O-CU-CP 607, O-CU-UP 609, O-DU 611, and/or O-RU 613 (e.g., via an O1 and/or O2 interface).

Figure 7:
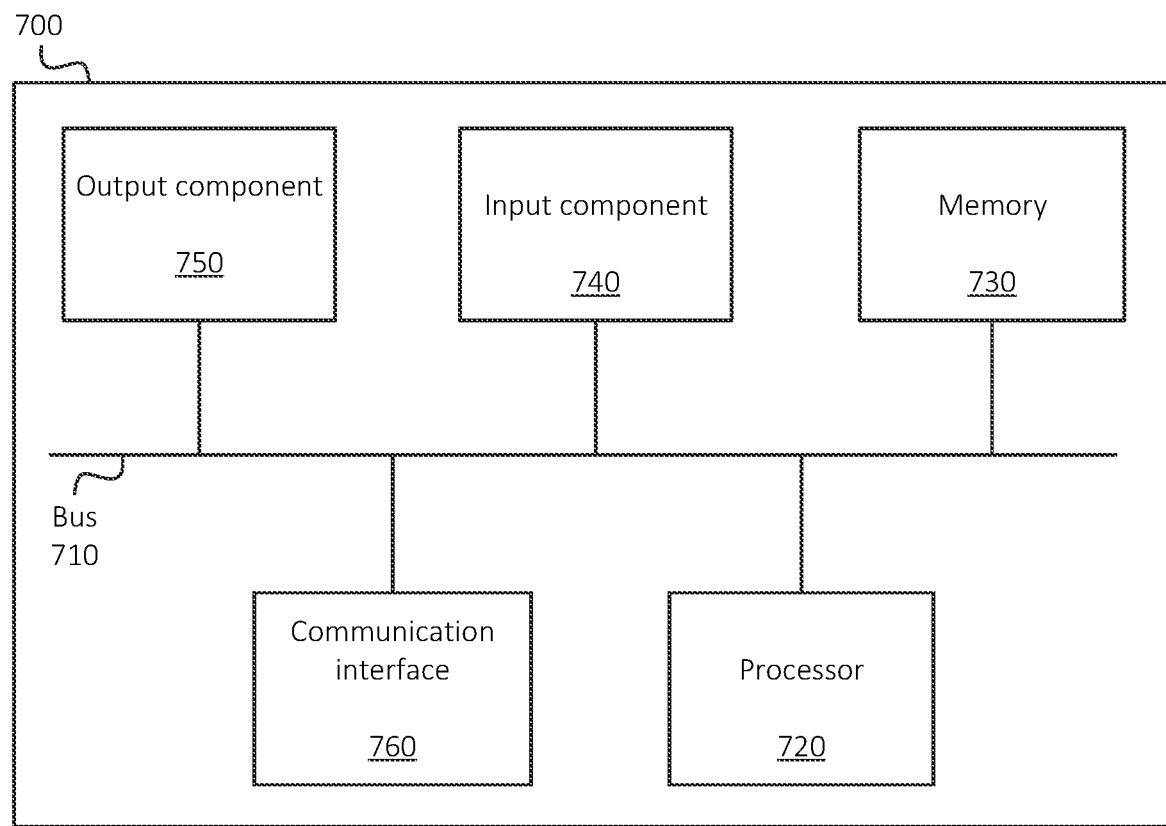
FIG. 7 illustrates example components of one or more devices, in accordance with one or more embodiments described herein.

FIG. 7 illustrates example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. In some embodiments, processor 720 may be or may include one or more hardware processors. Memory 730 may include any type of dynamic storage device that may store information and instructions for execution by processor 720, and/or any type of non-volatile storage device that may store information for use by processor 720.

Input component 740 may include a mechanism that permits an operator to input information to device 700 and/or other receives or detects input from a source external to 740, such as a touchpad, a touchscreen, a keyboard, a keypad, a button, a switch, a microphone or other audio input component, etc. In some embodiments, input component 740 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-3), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
monitor, via a Central Unit ("CU") of a radio access network ("RAN") of a wireless network, radio frequency ("RF") metrics associated with a User Equipment ("UE"), the monitored RF metrics being based on communications between the UE and a Distributed Unit ("DU") that is communicatively coupled to the CU;
identify a Multi-Access/Mobile Edge Computing ("MEC") device that is communicatively coupled to the DU and that provides one or more services to the UE via the DU;
determine a set of resource allocation parameters for the MEC, associated with the one or more services provided to the UE, based on the RF metrics between the UE and the DU; and
instruct the MEC to implement the set of resource allocation parameters, wherein the MEC modifies an allocation of MEC resources, allocated for providing the one or more services to the UE, based on the determined set of resource allocation parameters.

2. The device of claim 1, wherein the one or more processors are further configured to:
identify one or more performance profiles associated with the one or more services provided by the MEC to the UE; and
determine the set of resource application parameters based on the one or more performance profiles associated with the one or more services.

3. The device of claim 1, wherein, prior to implementing the set of resource allocation parameters, the one or more services are provided with a particular set of performance metrics, and
wherein after the set of resource allocation parameters are implemented by the MEC, the one or more services are provided with the same particular set of performance metrics.

4. The device of claim 1, wherein the MEC modifies one or more parameters of the one or more services based on the modified allocation of MEC resources allocated for providing the one or more services to the UE.

5. The device of claim 4, wherein the one or more parameters of the one or more services include at least one of:
a framerate, or
a video resolution.

6. The device of claim 1, wherein the DU is a first DU and wherein the MEC is a first MEC, wherein the one or more processors are further configured to:
identify RF metrics between the UE and a second DU that is associated with a second MEC;
determine that the RF metrics between the UE and the second DU exceed one or more thresholds; and instruct, based on determining that the RF metrics between the UE and the second DU exceed the one or more thresholds, the first MEC to provide state information associated with the one or more services to the second MEC.

7. The device of claim 1, wherein the RF metrics include at least one of:
   a set of Received Signal Strength Indicator ("RSSI") values,
   a set of Reference Signal Received Power ("RSRP") values,
   a set of Reference Signal Received Quality ("RSRQ") values,
   a set of Signal-to-Interference-and-Noise-Ratio ("SINR") values, or
   a set of Channel Quality Indicator ("CQI") values.

8. A non-transitory computer-readable medium, storing a plurality of processor-executable instructions to:
   monitor, via a Central Unit ("CU") of a radio access network ("RAN") of a wireless network, radio frequency ("RF") metrics associated with a User Equipment ("UE"), the monitored RF metrics being based on communications between the UE and a Distributed Unit ("DU") that is communicatively coupled to the CU;
   identify a Multi-Access/Mobile Edge Computing ("MEC") device that is communicatively coupled to the DU and that provides one or more services to the UE via the DU;
   determine a set of resource allocation parameters for the MEC, associated with the one or more services provided to the UE, based on the RF metrics between the UE and the DU; and
   instruct the MEC to implement the set of resource allocation parameters, wherein the MEC modifies an allocation of MEC resources, allocated for providing the one or more services to the UE, based on the determined set of resource allocation parameters.

9. The non-transitory computer-readable medium of claim 8, wherein the plurality of processor-executable instructions further include processor-executable instructions to:
   identify one or more performance profiles associated with the one or more services provided by the MEC to the UE; and
   determine the set of resource application parameters based on the one or more performance profiles associated with the one or more services.

10. The non-transitory computer-readable medium of claim 8, wherein, prior to implementing the set of resource allocation parameters, the one or more services are provided with a particular set of performance metrics, and
    wherein after the set of resource allocation parameters are implemented by the MEC, the one or more services are provided with the same particular set of performance metrics.

11. The non-transitory computer-readable medium of claim 8, wherein the MEC modifies one or more parameters of the one or more services based on the modified allocation of MEC resources allocated for providing the one or more services to the UE.

12. The non-transitory computer-readable medium of claim 11, wherein the one or more parameters of the one or more services include at least one of:
    a framerate, or
    a video resolution.

13. The non-transitory computer-readable medium of claim 8, wherein the DU is a first DU and wherein the MEC is a first MEC, wherein the plurality of processor-executable instructions further include processor-executable instructions to:
    identify RF metrics between the UE and a second DU that is associated with a second MEC;
    determine that the RF metrics between the UE and the second DU exceed one or more thresholds; and
    instruct, based on determining that the RF metrics between the UE and the second DU exceed the one or more thresholds, the first MEC to provide state information associated with the one or more services to the second MEC.

14. The non-transitory computer-readable medium of claim 8, wherein the RF metrics include at least one of:
    a set of Received Signal Strength Indicator ("RSSI") values,
    a set of Reference Signal Received Power ("RSRP") values,
    a set of Reference Signal Received Quality ("RSRQ") values,
    a set of Signal-to-Interference-and-Noise-Ratio ("SINR") values, or
    a set of Channel Quality Indicator ("CQI") values.

15. A method, comprising:
    monitoring, via a Central Unit ("CU") of a radio access network ("RAN") of a wireless network, radio frequency ("RF") metrics associated with a User Equipment ("UE"), the monitored RF metrics being based on communications between the UE and a Distributed Unit ("DU") that is communicatively coupled to the CU;
    identifying a Multi-Access/Mobile Edge Computing ("MEC") device that is communicatively coupled to the DU and that provides one or more services to the UE via the DU;
    determining a set of resource allocation parameters for the MEC, associated with the one or more services provided to the UE, based on the RF metrics between the UE and the DU; and
    instructing the MEC to implement the set of resource allocation parameters, wherein the MEC modifies an allocation of MEC resources, allocated for providing the one or more services to the UE, based on the determined set of resource allocation parameters.

16. The method of claim 15, further comprising:
    identifying one or more performance profiles associated with the one or more services provided by the MEC to the UE; and
    determining the set of resource application parameters based on the one or more performance profiles associated with the one or more services.

17. The method of claim 15, wherein, prior to implementing the set of resource allocation parameters, the one or more services are provided with a particular set of performance metrics, and
    wherein after the set of resource allocation parameters are implemented by the MEC, the one or more services are provided with the same particular set of performance metrics.

18. The method of claim 15, wherein the MEC modifies one or more parameters of the one or more services based on the modified allocation of MEC resources allocated for providing the one or more services to the UE.

19. The method of claim 15, wherein the DU is a first DU and wherein the MEC is a first MEC, the method further comprising:

identifying RF metrics between the UE and a second DU that is associated with a second MEC;
determining that the RF metrics between the UE and the second DU exceed one or more thresholds; and
instructing, based on determining that the RF metrics between the UE and the second DU exceed the one or more thresholds, the first MEC to provide state information associated with the one or more services to the second MEC.

20. The method of claim 15, wherein the RF metrics include at least one of:
   a set of Received Signal Strength Indicator ("RSSI") values,
   a set of Reference Signal Received Power ("RSRP") values,
   a set of Reference Signal Received Quality ("RSRQ") values,
   a set of Signal-to-Interference-and-Noise-Ratio ("SINR") values, or
   a set of Channel Quality Indicator ("CQI") values.

* * * * *